(12) United States Patent
Filseth

(10) Patent No.: US 9,232,861 B2
(45) Date of Patent: Jan. 12, 2016

(54) PORTABLE STAND

(71) Applicant: Kristin Filseth, Raphine, VA (US)

(72) Inventor: Kristin Filseth, Raphine, VA (US)

(*) Notice: Subject to any disclaimer, the term of this patent is extended or adjusted under 35 U.S.C. 154(b) by 0 days.

(21) Appl. No.: 14/483,030

(22) Filed: Sep. 10, 2014

(65) Prior Publication Data

US 2015/0069191 A1  Mar. 12, 2015

Related U.S. Application Data

(60) Provisional application No. 61/960,144, filed on Sep. 11, 2013.

(51) Int. Cl.
*F16M 11/00* (2006.01)
*A47D 5/00* (2006.01)

(52) U.S. Cl.
CPC ...................... *A47D 5/006* (2013.01)

(58) Field of Classification Search
CPC .......... A61D 3/00; A61G 13/00; A47D 1/02; A47D 5/006
See application file for complete search history.

(56) References Cited

U.S. PATENT DOCUMENTS

| | | | | |
|---|---|---|---|---|
| 3,839,754 A | * | 10/1974 | Hooper | 5/98.2 |
| 4,544,203 A | * | 10/1985 | Younger et al. | 297/391 |
| 5,044,690 A | * | 9/1991 | Torrey | 297/16.1 |
| 6,092,866 A | * | 7/2000 | Wu | 297/56 |

* cited by examiner

*Primary Examiner* — Amy Sterling
(74) *Attorney, Agent, or Firm* — Sheppard Mullin Richter & Hampton LLP

(57) ABSTRACT

A portable stand for securely supporting an object or infant above a vehicle seat is presented. The stand is adjustable for use on an angled or flat surface. The stand securely engages the gap in a vehicle seat, thereby providing a stable support surface for an object. The stand is easily collapsible for storage.

13 Claims, 7 Drawing Sheets

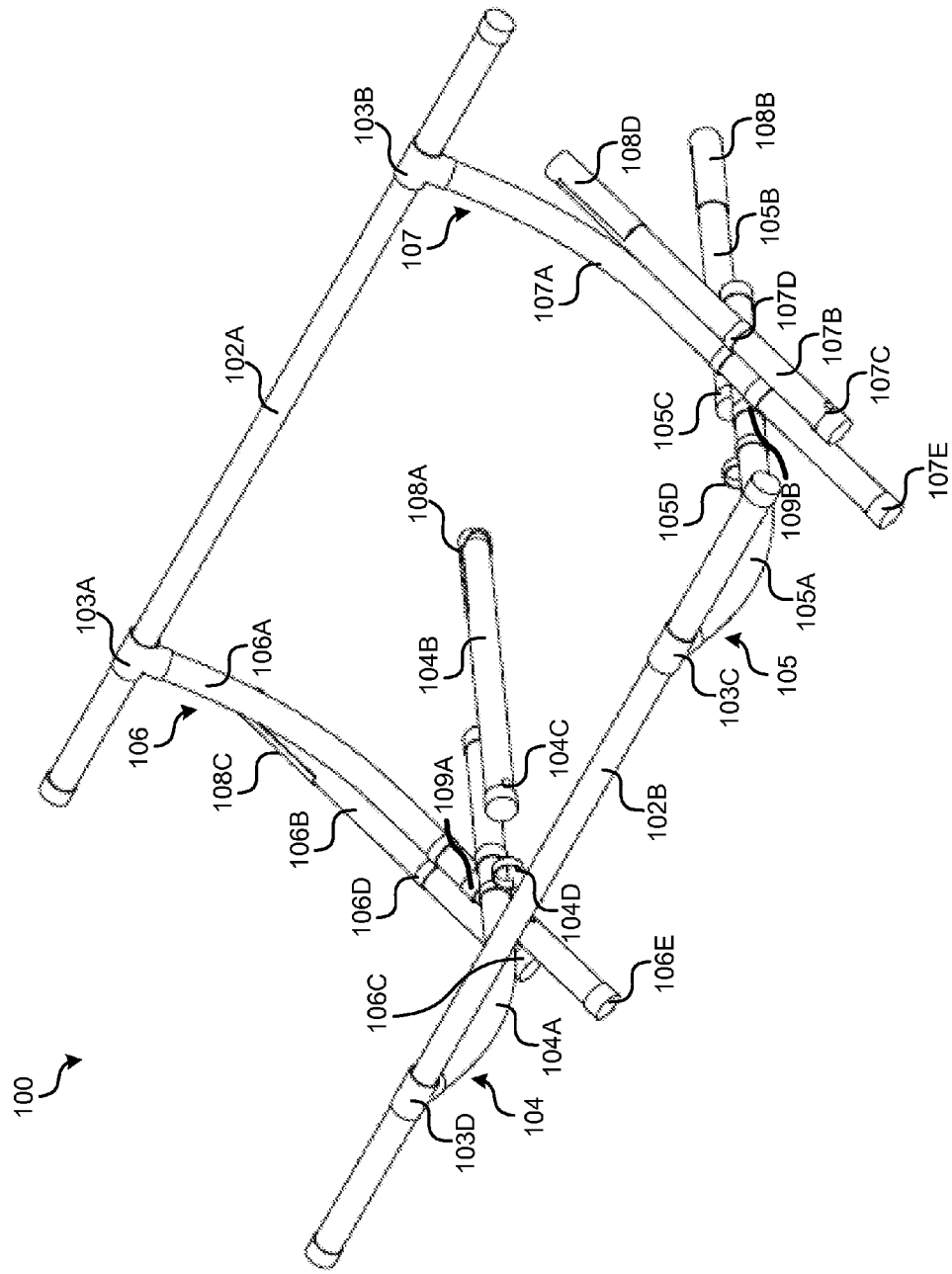

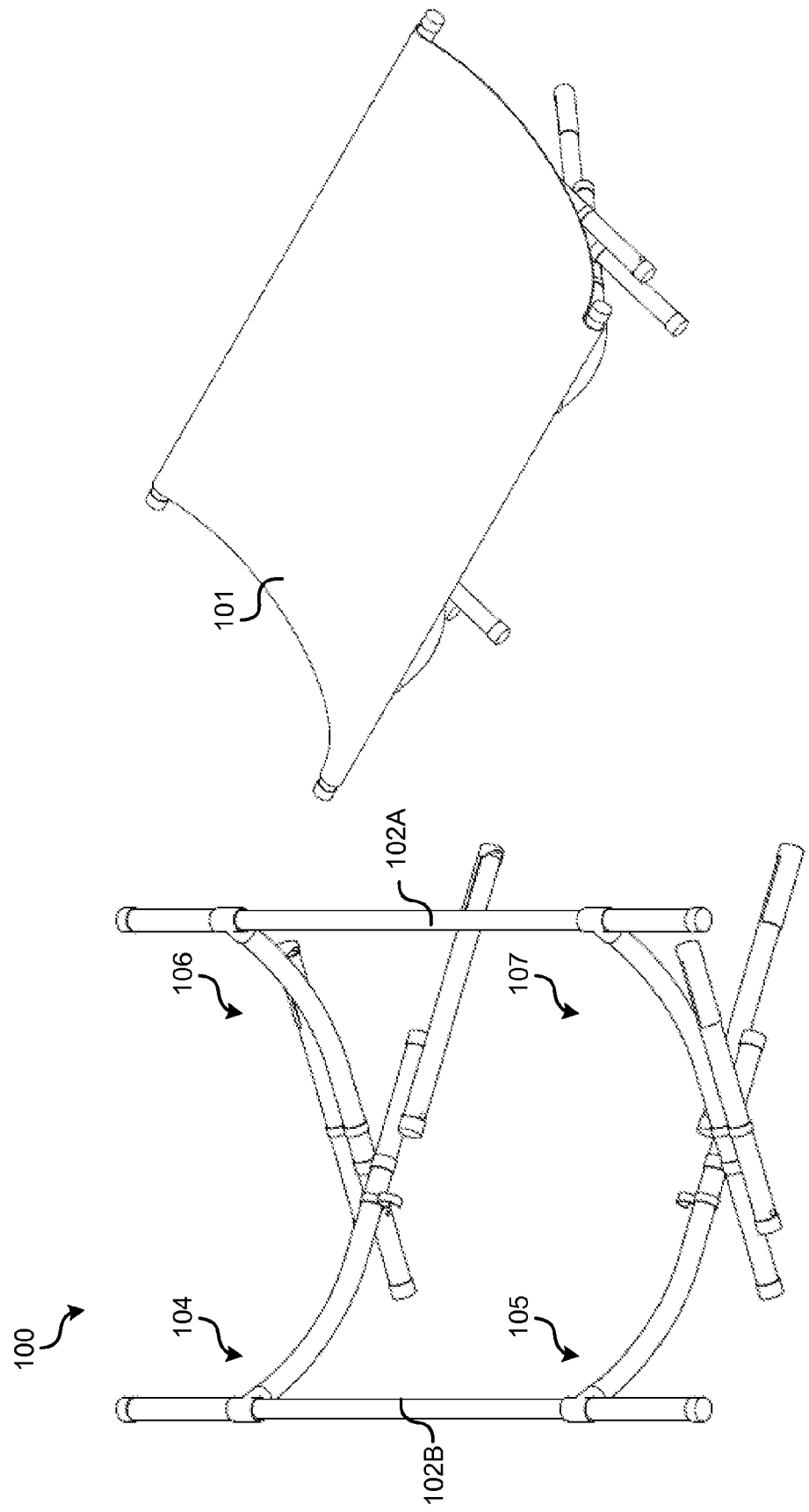

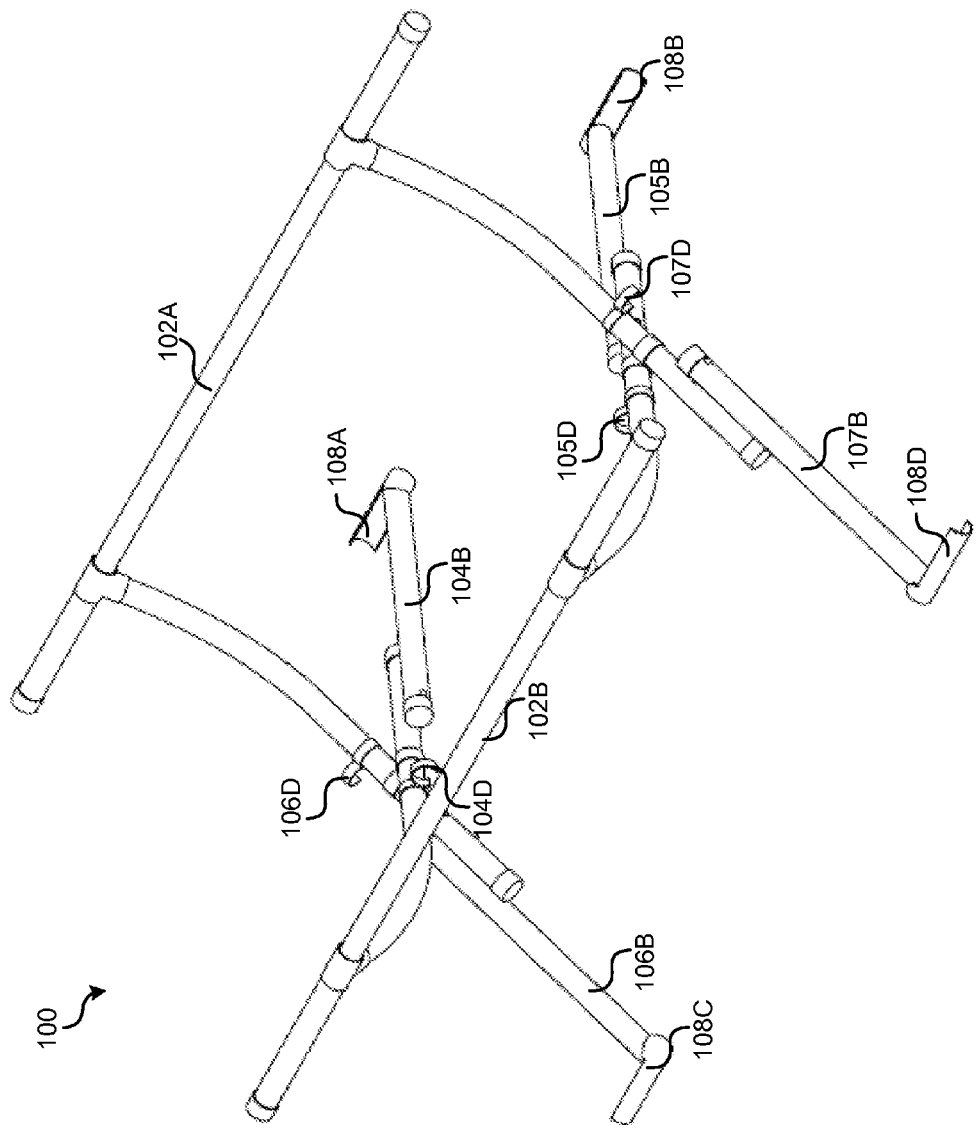

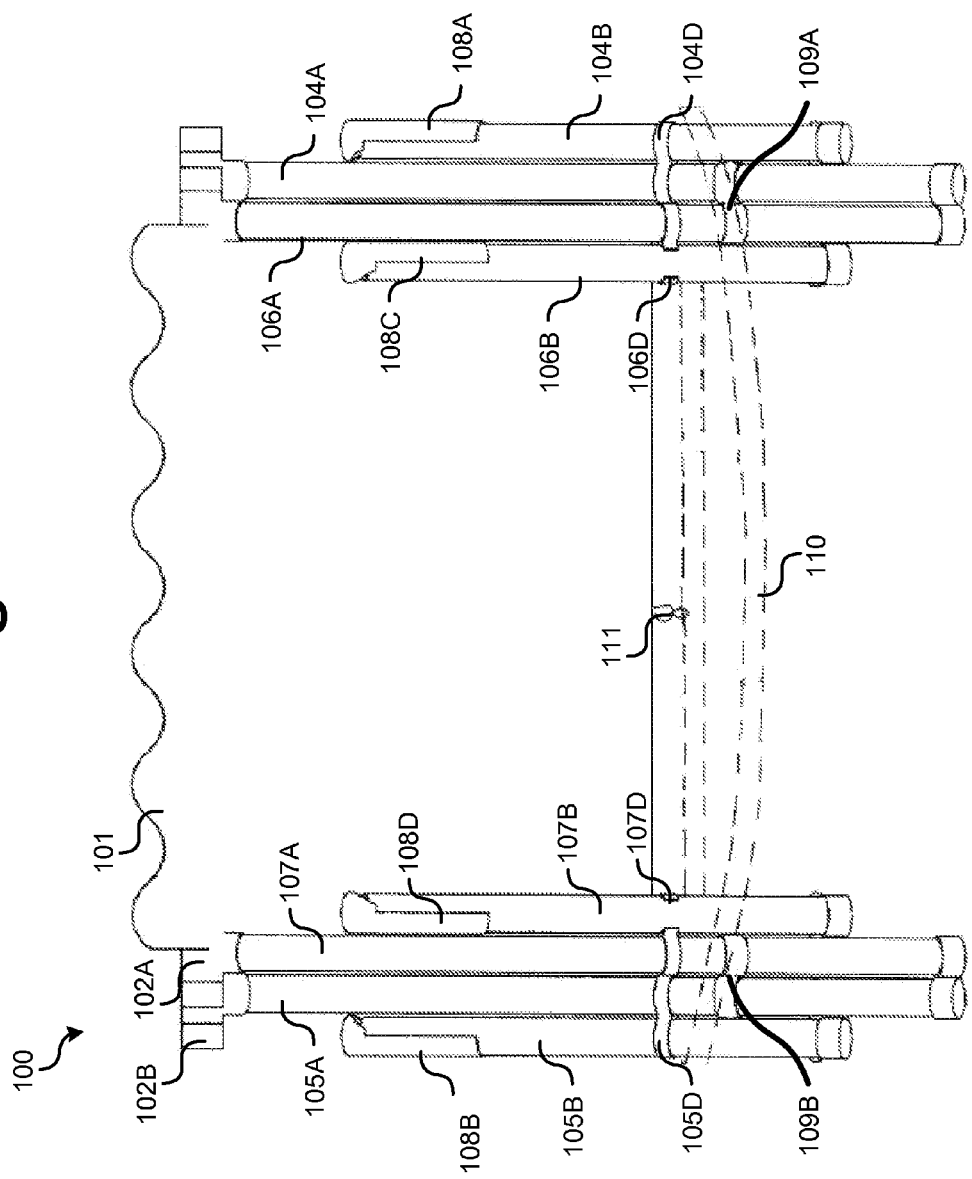

PORTABLE STAND

CROSS-REFERENCE TO RELATED APPLICATIONS

This application claims the benefit of U.S. Provisional Application No. 61/960,144, filed Sep. 11, 2013, which is incorporated herein by reference in its entirety.

TECHNICAL FIELD

The present invention relates generally to portable stands, and more particularly, some embodiments relate to portable stands for securely supporting or suspending an object or infant above the seat of a vehicle.

BACKGROUND

Infants need frequent diaper changing when out in public or during travel. It is often inconvenient and undesirable to use public restroom changing tables because of privacy, health, and/or wait concerns. Outdoor alternatives may be as undesirable. A stroller may not provide a flat surface. The ground may be hard and uncomfortable for the infant. Outdoor weather may be unpleasant.

Thus, parents often change their infant's diaper in their vehicle. For example, parents may change an infant in the cargo area of a SUV or on the floor of a van. However, even with a blanket or pad the floor can be a hard surface and the infant may accidentally roll. Smaller vehicles may require that the parent stand outside the car. This is undesirable in inclement weather or when the caretaker desires privacy.

Changing an infant directly on the seat of the car has drawbacks. Because most car seats are angled, there is a risk that the infant will roll into the crevice made by the seat and seat-back. The infant can also easily fall off the front of the seat and risk injury. The angled seat surface requires the infant to lie over bumps and increases the risk that waste will get on the car seat. Further, many families own vehicles that provide limiting seating or space for changing an infant.

It is therefore desirable to have a portable stand that can fit over the bumps and angle of a car's angled seat surface to provide a level space for safely changing an infant. Further, it is desirable to configure such a stand with an adaptable design for use on a level surface in a variety of settings.

SUMMARY OF THE DISCLOSURE

In various embodiments, a portable stand is disclosed. In one embodiment, the portable stand may include first and second telescoping rail assemblies, first and second legs coupled to the first rail assembly, third and fourth legs coupled to the second rail assembly, and a cloth cover coupled to the rail assemblies and configured to open in a contour shape when the stand is opened. In this embodiment, each of the four legs comprises a lower leg member rotatingly coupled to an upper leg member and configured to fold to an open or closed position. In further embodiments, the stand may include four feet, each foot directly coupled to each of the four lower leg members and configured to fold in an open or closed position.

In one embodiment, the stand may include a first folding hinge directly coupling the first leg to the third leg, and a second folding hinge directly coupling the second leg to the fourth leg. In this embodiment, the pair of directly coupled legs scissor open about their respective hinge fitting when the stand is opened. In further implementations of this embodiment, each of the folding hinges may include a stop configured to limit the maximal opening angle of the stand such that the cloth cover opens in a contour shape. In implementations of this embodiment, each of the upper leg members is curved.

In one embodiment, the stand is configurable for stably mounting on an angled seat including a seat back and seat. In this embodiment, the configuration for mounting the stand on an angled seat may include: closed lower leg members of the third and fourth legs and opened lower leg members of the first and second legs. In this embodiment, the ends of the upper leg members of the third and fourth legs are configured to contact the front of the seat, and the ends of the lower leg members of the first and second legs are configured for insertion between the seat back and seat. In implementations of this embodiment, the ends of the upper leg members of the third and fourth legs comprise a nonslip material.

In another embodiment, the stand is configurable for stably mounting on a flat surface. In this embodiment, the configuration for mounting the stand on the flat surface includes opened lower leg members of the four legs and opened feet of the four legs.

In yet another embodiment, each rail assembly includes an inner middle section configured to telescope into two outer ends. In implementations of this embodiment, the cloth cover is fixed to the ends of the rail assemblies and configured to crumple along the length of the rail assemblies as they are telescoped to a shorter length.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are described in detail with reference to the following figures. The drawings are provided for purposes of illustration only and merely depict typical or example embodiments. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 1A-1C illustrate an exemplary portable stand in a vehicle seat mounting position in accordance with an embodiment.

FIGS. 3A-C illustrate the portable stand of FIG. 1 in a position for use on a level surface in accordance with an embodiment.

FIG. 4 illustrates the portable stand of FIG. 1 in a stowed position.

The figures are not intended to be exhaustive or to limit the invention to the precise form disclosed. It should be understood that the embodiments and invention can be practiced with modification and alteration, and that the invention be limited only by the claims and the equivalents thereof.

DETAILED DESCRIPTION OF THE DRAWINGS

The present embodiments are directed toward portable stands. The disclosed portable stand may be implemented in a variety of environments where support on a soft (e.g. couch), angled (e.g. car seat), or flat surface would be beneficial. For example, the disclosed stand may be used as support for a laptop, support for an elevated pet carrier, support for a portable children's play or snack table, etc.

Particular embodiments are directed toward portable stands for supporting an infant above a vehicle seat during diaper changing. In these embodiments, the design features of the stand, including the legs, material, shape, position (angle) and length, allow an easy fit into the juncture between a vehicle seat back and seat, which makes the weight bearing surface of the device able to support extremely un-centered weight without tipping. FIGS. 1-4 illustrate one such embodiment of a portable stand 100.

As used herein in the accompanying descriptive text, the "front" of the stand 100 is defined as the side of the stand closest to the front of a vehicle when the stand is positioned for use in a vehicle. The "back" of the stand 100 is defined as the side of the stand closest to the back of the vehicle when the stand is positioned for use in a vehicle. The "back legs" are those that have their lower members closest to the back of the vehicle. Use of these terms is merely descriptive and for ease of illustration, and is not meant to limit the scope of the invention, which is defined by the claims attached hereto.

FIGS. 1A-1C illustrate the stand 100 in a vehicle seat mounting position in accordance with an embodiment of the present disclosure. The stand includes a cloth cover 101, front longitudinal rail assembly 102A, back longitudinal rail assembly and 102B, and four fittings 103A-103D attaching the rail assemblies to front legs 106-107 and back legs 104-105. The construction of the rail assemblies and legs may comprise aluminum, plastic tubing, solid rod or some combination thereof.

Figure 2:
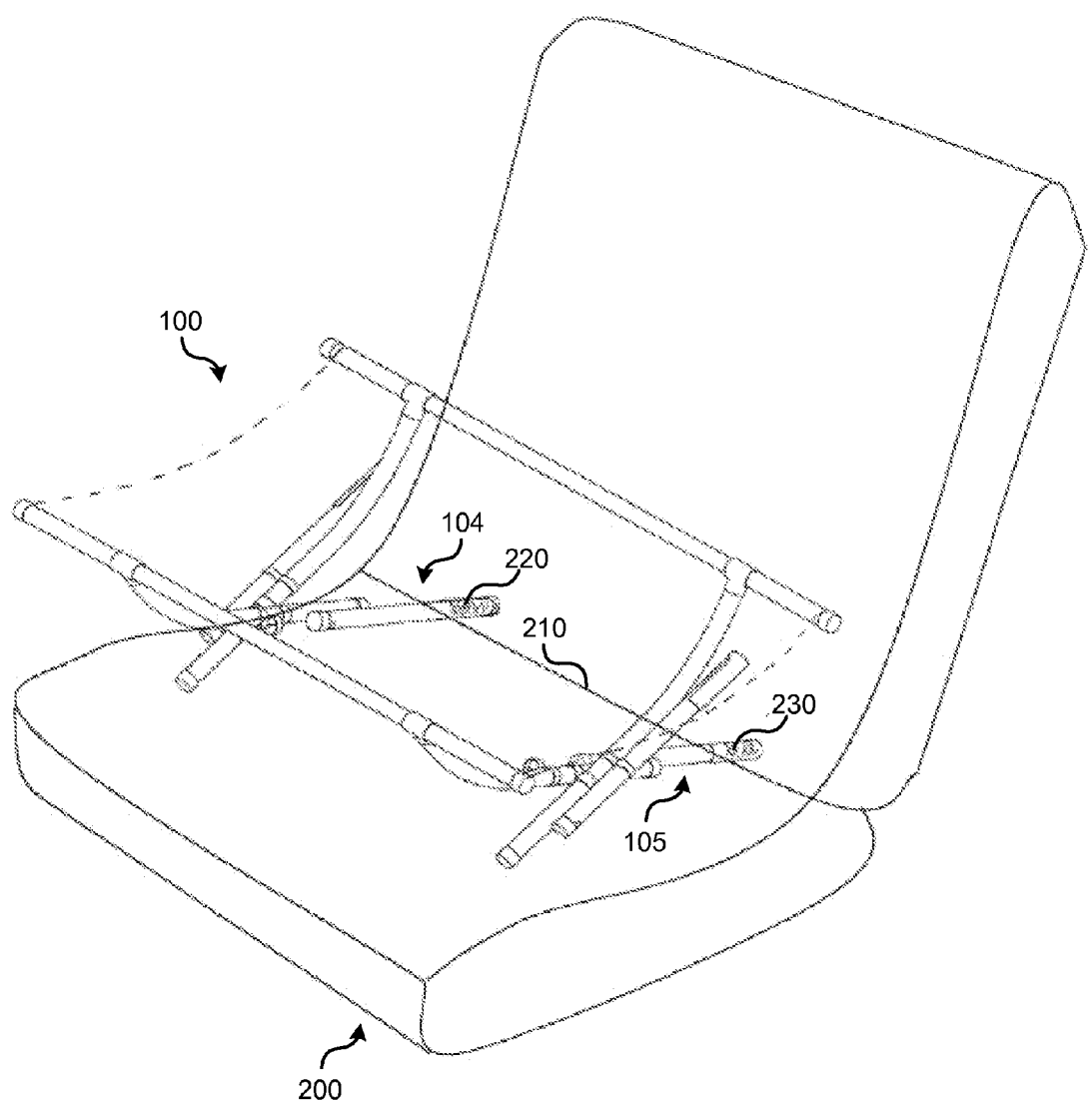
FIG. 2 illustrates the portable stand of FIG. 1 mounted on a vehicle seat.

As illustrated in FIG. 2, the stand 100 is configured to securely mount on a vehicle seat 200 by placing the back legs 104 and 105 into the seat gap 210 as indicated by crosshatchings 220 and 230. This placement enhances the stability of the stand 100 and conveniently allows use of the stand as a support apparatus. Consider, for example, an environment where the stand 100 is used as a diaper changing apparatus in the front passenger seat of a vehicle. In this environment, the caregiver sits in the driver's seat, arranges the stand 100 on the passenger seat, and then lays the infant down on cloth cover 101 with the infant's feet facing the caregiver. In this configuration, the stand remains stable even if the infant rocks back and forth, thereby providing the caregiver a convenient and stable surface for changing the infant.

Cloth cover 101 comprises a foldable fabric material (e.g. cotton, polyester, hemp, bamboo, wool, or some combination thereof) and is detachably or fixedly attached to side rail assemblies 102A and 102B using a suitable coupling mechanism (e.g. screws, rings, glue, Velcro™, etc.). Cloth cover 101 is fixed at the ends of side rail assemblies 102A and 102B, but glides freely over the midsections of the rail assemblies. In the illustrated embodiment, cloth cover 101 provides a contoured changing surface that supports and cradles an infant during diaper changing. The contoured changing surface provides the benefit of preventing the infant from rolling over during diaper changing. In alternative embodiments, cloth cover 101 may be configured to open into a substantially flat surface.

In the illustrated embodiment, longitudinal rail assemblies 102A and 102B are parallel and form the front and back sides of the changing surface 101. Each rail assembly comprises an inner middle section that telescopes into two end sections of greater diameter. In this configuration, the rail assemblies may be lengthened by pulling on the two ends of cloth cover 101. Similarly, the rail assemblies may be collapsed by pushing on the two ends of cloth cover 101 or the ends of the rail assemblies. This telescoping function provides two benefits. First, during operation the middle section may be telescoped to a plurality of extended or collapsed positions, thereby adapting the stand 100 for a plurality of car seat widths. Notwithstanding slight folds in cloth cover 101, the functional utility of the stand 100 is not compromised by limiting the extension length of the rail assemblies to accommodate small seat widths. Second, the middle section may be telescoped to a completely collapsed position to minimize the profile of the stand 100 during storage.

In an environment where the stand is used by a caregiver for changing an infant on the seat of a vehicle, the rail assemblies may be extended, for example, to lengths of 18 to 32 inches. In various implementations of the stand in this environment, the maximum extension length of the rail assemblies may depend, for example, on the size of the infant, the caregiver's preferences, the limits of the mounting surface, and other obstacles.

With reference now to legs 104-107, back legs 104 and 105 are on the inside of front legs 106 and 107. This disclosed configuration provides the benefit of maximizing the use of a vehicle seat's angled design because the angled seat of a vehicle has a relatively small area in which the back legs may be inserted. As illustrated in this embodiment, each leg 104-107 respectively includes an upper leg member 104A-107A coupled to a lower leg member 104B-107B and a fitting 103A-103D. Each lower leg member 104B-107B is rotatingly coupled to an upper leg member 104A-107A via hinge fitting 104C-107C about which each lower leg may fold on itself to a maximum total length extension. In various embodiments, the unextended leg length for each leg is less than the extended leg length. In one particular embodiment, the unextended leg length (i.e. when lower legs are folded closed) for each leg is approximately three fifths of the maximum extended leg length (i.e. when lower legs are folded open). FIGS. 1-2 illustrate back legs 104-105 folded open and front legs 106-107 folded close.

As illustrated in this particular embodiment, upper leg members 104B-107B are curved and lower leg members 104B-107B are straight. The curvature of upper leg members 104B-107D prevents an infant from hitting the upper leg members through the cloth and permits a greater curvature of the contoured surface 101. In alternative embodiments, upper leg members 104B-107D may be straight. Each leg additionally comprises a folding foot 108A-108D rotatingly coupled to a lower leg member 104A-107A.

Folding hinge fittings 109A and 109B each couple a front leg upper member to an adjacent back leg upper member at each end of stand 100. When stand 100 opens, the pair of legs at each end scissor open about the hinge fittings so that each pair forms the X-shaped configuration illustrated by FIG. 1. In the illustrated embodiment, folding hinge fittings 109A and 109B each includes a stop that limits the maximal opening angle of stand 100 in the X-shaped configuration such that the changing surface of cloth cover 101 retains a small curve, i.e. contoured shaped, when fully open. This contoured shape effectively creates barriers of a given height around each side of the infant when it rests on cloth cover 101. This height may be configured in accordance with acceptable safety standards for infant changing tables. Alternatively, the stop may be removed or disengaged to further allow for a flat configuration of cloth 101. When force is applied downward onto the changing surface 101, the force biases folding hinge fittings 109A and 109B open. In some embodiments, folding hinge fittings 109A and 109B are removable and adjustable. For example, folding hinge fittings may comprise a bolt that is removable and replaceable at different holes along the length of each pair of connected legs, thereby adjusting the angle at which each pair of legs scissors open about the hinge fittings.

In the car seat mounting position of FIGS. 1-2, each back lower leg member 104B-105B is fully extended (i.e. folded open) by rotating it downward, away from retaining fittings 104D and 105D for insertion into seat gap 210. Front leg lower members 106B and 107B are fully unextended (i.e. folded closed) and secured by retaining fittings 106D and 107D. Accordingly, front leg upper members contact the front part of the seat at surface ends 106E-107E. All four folding feet 108A-108D are folded closed against the surface of lower leg members 104B-107B. In this configuration, the effective length of back legs 104 and 105 is greater than the effective length of front legs 106 and 107, thereby compensating for the angled seat in a car and providing a level changing surface.

In one embodiment, the ends of lower leg members 104A-105A and/or foot fittings 108A-108B may be configured to provide the benefits of easy insertion into seat gap 210 and stability while inserted into seat gap 210. For example, the ends may have a small tapered diameter and comprise a high friction textured material. In another embodiment, the surface ends 106E-107E of upper leg members 106A-107A may also comprise a high friction, non-slip material (e.g. a textured metal, an applied polymer coating or cover, etc.) that further adds stability to stand 100.

Figure 3C:
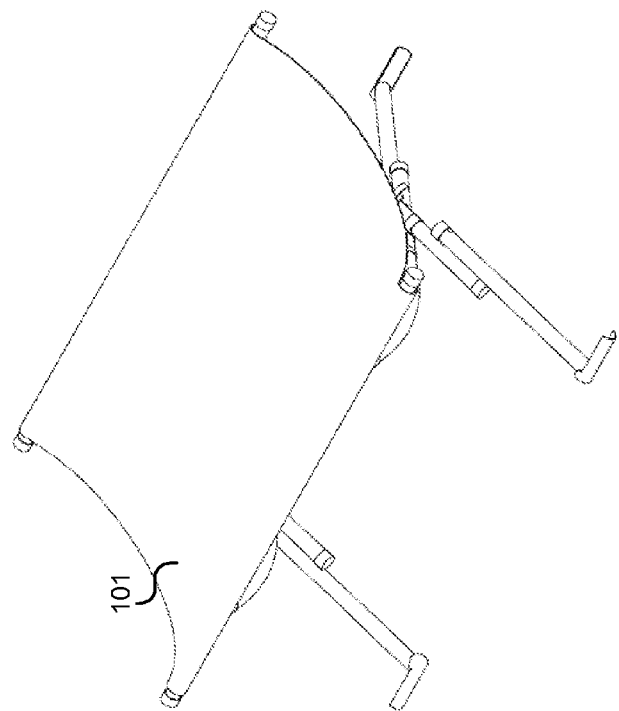
Figure 3B:
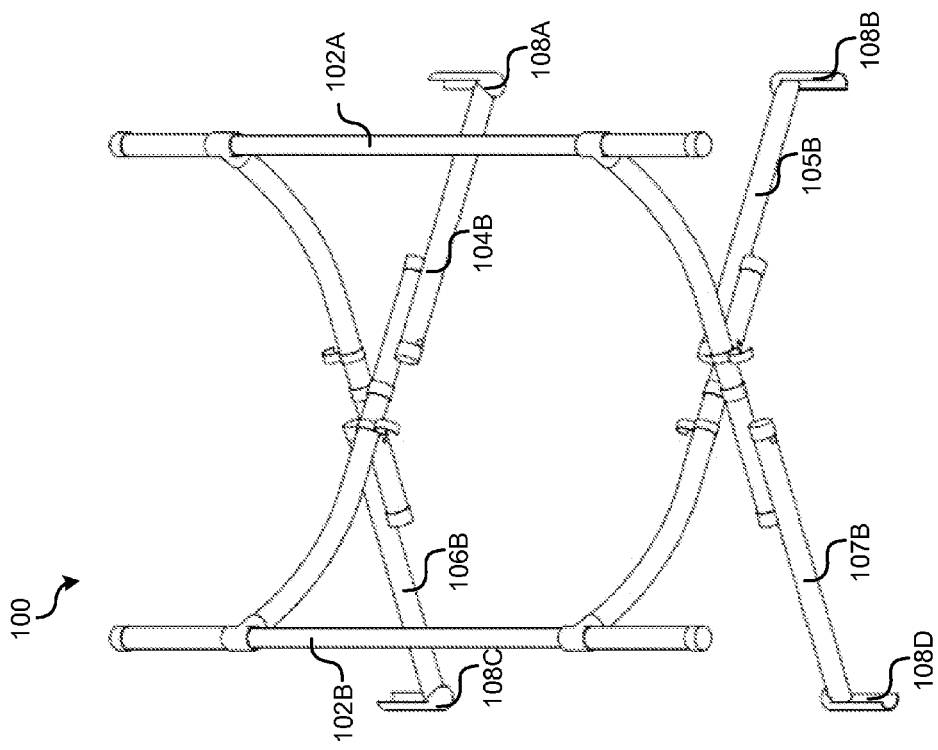

FIGS. 3A-3C illustrate the stand 100 in a position for use on a level surface in accordance with an embodiment. In this configuration, all back and front lower leg members 104B-107B are fully extended, i.e. unfolded. Each lower leg member 104B-107B may be unfolded by rotating it away from its respecting retaining fitting 104D-107D. In the illustrated position, all four feet 108A-108D are unfolded approximately 90 degrees from the surface of lower leg members 104B-107B and contact the level ground. The feet extend in a longitudinal direction approximately parallel to rail assemblies 102A-102B. In the illustrated embodiment, the tip of each foot is configured to extend slightly past surface 101, thereby enhancing stability and preventing tipping of stand 100 when the weight on surface 101 is concentrated at its ends.

In the illustrated embodiment, folding feet 108A-108D may be manually unfolded. Alternatively, in one embodiment an internal tension wire may automatically bias front leg feet 108C and 108D open when the lower front leg members 106B and 107B are opened. In further embodiments, feet 108A-108B of back legs 104-105 may comprise a different color and/or texture than other parts of stand 101 so that they can be easily identified by a user for proper use (orientation) of stand 101. In yet further embodiments, feet 108A-108D are detachable and replaceable.

FIG. 4 illustrates the stand 100 in a stowed position. When closing stand 100 from the fully open position of FIG. 3, the feet 108A-108D are folded to a closed position against the surface of lower leg members 104B-107B. Back and front lower leg members 104B-107B are fully retracted and secured (i.e. folded) to their respective retaining fittings 104D-107D, which hold the lower leg members in a closed position for storage.

Stand 100 is further closed by pushing rail assembles 102A and 102B toward one another, thereby pivoting each coupled front and back leg about folding hinge fittings 109A and 109B from the X-shaped configuration of FIG. 1A to the approximately parallel stored configuration of FIG. 4. In the final stowed configuration illustrated in FIG. 4, rail assemblies 102A and 102B nearly contact each other.

Each rail assembly may also be telescoped to a shorter length. As illustrated by FIG. 4, cloth cover 101 is coupled to the rail assemblies 102A and 102B in a configuration that allows compacting (i.e. crumpling) of the cover 101 along the length of the rail assemblies as they are telescoped to a shorter length.

Although FIG. 4 illustrates stand 100 in a fully collapsed position, not all collapse maneuvers would necessarily be needed to fit stand 100 in a storage location such as under the seat of a vehicle or a bag.

In one embodiment, a strap 110 with Velcro™ closure on the ends (shown by dashed lines) may secure legs 104-107 in a closed position for storage. In this embodiment, strap 110 is coupled to the bottom of cloth cover 101 by a swivel attachment 111. In further embodiments, strap 110 may safely restrain an infant when stand 100 is used as a diaper changing stand.

Figure 5:
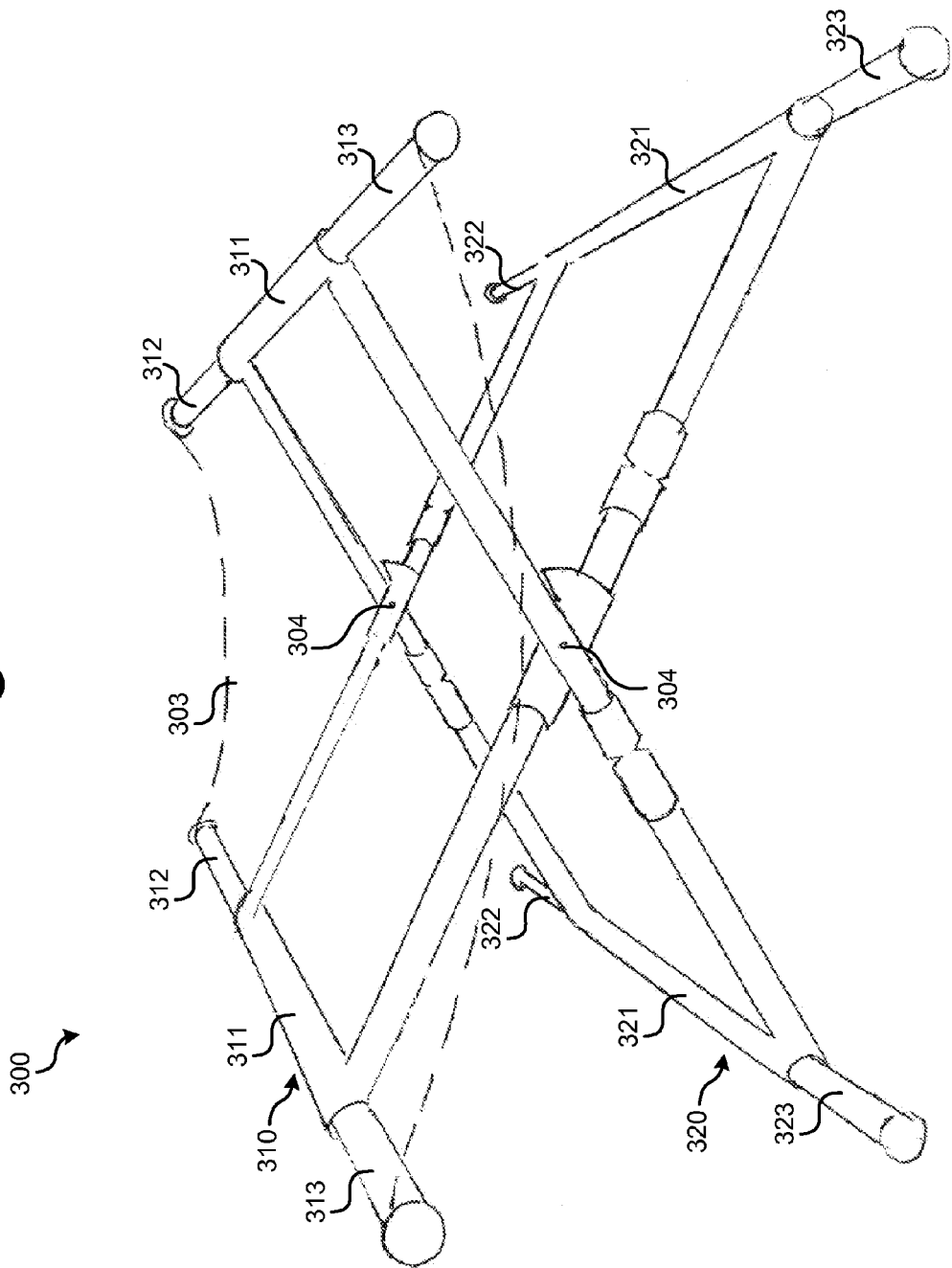
FIG. 5 illustrates another exemplary portable stand implemented in accordance with an embodiment.

FIG. 5 illustrates another exemplary vehicle stand 300 implemented in accordance with an embodiment. In this alternative embodiment, instead of legs that are independent from one another at the ends, the pairs of legs are joined by four rails forming two intersecting rectangular sections. Each rectangular section comprises a top rail assembly 310 coupled to a bottom rail assembly 320. An inner rectangular section is rotatingly coupled to the insides of an outer rectangular section at hinges 304. Top rail assemblies 310 attach to cloth cover 303 and include a middle section 311 and inner telescoping ends 312 and 313. In this alternative embodiment, each top rail assembly 310 telescopes at ends 312 and 313, rather than in middle section 311. Bottom rail assemblies 320 include a middle section 321 and inner telescoping ends 322 and 323. In one implementation of this embodiment, telescoping ends 322 and 323 are feet that stabilize stand 300. In this embodiment, for example, the feet may telescope longitudinally using a press in and pop out spring mechanism. One benefit of this rectangular leg linking stand is that it requires simple fold motions for opening and collapsing.

While various embodiments have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The presence of broadening words and phrases such as "one or more," "at least," "but not limited to" or other like phrases in some instances shall not be read to mean that the narrower case is intended or required in instances where such broadening phrases may be absent.

The invention claimed is:

1. A stand, comprising:
   first and second telescoping rail assemblies;
   first and second legs directly coupled to the first rail assembly;
   third and fourth legs directly coupled to the second rail assembly; and
   a cloth cover coupled to the two rail assemblies and configured to open in a contour shape when the stand is fully opened,
   wherein each of the four legs comprises a lower leg member rotatingly coupled to an upper leg member and configured to fold to an open or closed position;
   wherein the stand is configurable for stably mounting on an angled seat including a seat back and seat;
   wherein the configuration for mounting the stand on the angled seat, comprises:
      opened lower leg members of the first and second legs;
      closed lower leg members of the third and fourth legs; and
      wherein the ends of the upper leg members of the third and fourth legs are configured to contact the front of the seat;
   wherein the ends of the lower leg members of the first and second legs are configured for insertion between the seat back and seat; and
   wherein the effective length of each of the first and second legs is greater than the effective length of each of the third and fourth legs in the angled seat mounting configuration.

2. The stand of claim 1, further comprising:
   a first folding hinge directly coupling the first leg to the third leg;
   a second folding hinge directly coupling the second leg to the fourth leg; and
   wherein each pair of directly coupled legs is configured to scissor open about its respective hinge fitting when the stand is opened.

3. The stand of claim 2, wherein each of the folding hinges comprises a stop configure to limit the maximal opening angle of the stand such that the cloth cover opens in a contour shape.

4. The stand of claim 3, wherein each of the upper leg members is curved.

5. The stand of claim 2, wherein:
   the first leg is adjacent to the third leg and coupled to the inside of the third leg; and
   the second leg is adjacent to the fourth leg and coupled to the inside of the fourth leg.

6. The stand of claim 1, wherein the ends of the upper leg members of the third and fourth legs comprise a nonslip material.

7. The stand of claim 1, wherein the stand is further configurable for stably mounting on a flat surface, and wherein the stand comprises four feet, each foot directly coupled to each of the four lower leg members and configured to fold in an open or closed position.

8. The stand of claim 1, wherein the configuration for mounting the stand on the flat surface, comprises:
   opened lower leg members of the four legs; and
   opened feet of the four legs.

9. A portable and collapsible stand, comprising:
   first and second telescoping rail assemblies, each rail assembly comprising an inner middle section configured to telescope into two outer ends;
   a cloth cover coupled to the two rail assemblies, wherein for each rail assembly the cloth cover is fixed to the ends and configured to crumple along the length of the rail assembly as it is telescoped to a shorter length;
   first and second legs; and
   third and fourth legs,
   wherein each of the four legs comprises a lower leg member rotatingly coupled to an upper leg member.

10. The stand of claim 9, further comprising four retaining fittings, each fitting configured to engage a respective one of the legs when the stand is in a stowed position.

11. The stand of claim 9, wherein the cloth cover is crumpled along the length of the rail assemblies when the stand is in the stowed position.

12. The stand of claim 11, wherein each of the four lower leg members is approximately parallel when the stand is in the stowed position.

13. The stand of claim 12, wherein each of the four upper leg members is approximately parallel when the stand is in the stowed position.

* * * * *